(12) United States Patent
Berry (10) Patent No.: US 10,372,758 B2
(45) Date of Patent: Aug. 6, 2019

(54) USER INTERFACE FOR VIEWING TARGETED SEGMENTS OF MULTIMEDIA CONTENT BASED ON TIME-BASED METADATA SEARCH CRITERIA

(75) Inventor: Matthew Berry, Raleigh, NC (US)

(73) Assignee: TIVO SOLUTIONS INC., San Jose, CA (US)

( * ) Notice: Subject to any disclaimer, the term of this patent is extended or adjusted under 35 U.S.C. 154(b) by 0 days.

(21) Appl. No.: 13/334,285

(22) Filed: Dec. 22, 2011

(65) Prior Publication Data
US 2013/0166587 A1 Jun. 27, 2013

(51) Int. Cl.
*G06F 16/71* (2019.01)
*G06F 16/48* (2019.01)
*G06F 16/78* (2019.01)

(52) U.S. Cl.
CPC .............. *G06F 16/71* (2019.01); *G06F 16/48* (2019.01); *G06F 16/489* (2019.01); *G06F 16/7867* (2019.01)

(58) Field of Classification Search
USPC .............. 707/758; 715/716, 723; 725/41, 53
See application file for complete search history.

(56) References Cited

U.S. PATENT DOCUMENTS

| | | | | |
|---|---|---|---|---|
| 6,813,774 | B2 * | 11/2004 | Inoue | 725/39 |
| 6,925,602 | B1 * | 8/2005 | Clapper | 715/723 |
| 7,546,554 | B2 * | 6/2009 | Chiu | G06F 3/0481 715/719 |
| 8,566,315 | B1 * | 10/2013 | Davtchev | G06F 17/30817 707/736 |
| 2001/0027563 | A1 * | 10/2001 | White et al. | 725/46 |
| 2002/0106191 | A1 * | 8/2002 | Betz | G11B 27/034 386/244 |
| 2006/0143650 | A1 * | 6/2006 | Tanikawa et al. | 725/38 |
| 2007/0110399 | A1 * | 5/2007 | Roh | 386/95 |
| 2008/0046406 | A1 * | 2/2008 | Seide | G06F 17/30743 |
| 2008/0086688 | A1 * | 4/2008 | Chandratillake | G06F 17/30817 715/719 |
| 2008/0155627 | A1 * | 6/2008 | O'Connor | H04N 7/173 725/109 |
| 2009/0150947 | A1 * | 6/2009 | Soderstrom | 725/93 |

(Continued)

OTHER PUBLICATIONS

Snavely et al., Proceeding SIGGRAPH '06 ACM SIGGRAPH 2006 Papers pp. 835-846.*

(Continued)

*Primary Examiner* — Cheyne D Ly
(74) *Attorney, Agent, or Firm* — Haley Guiliano LLP (57) ABSTRACT

A system and method for navigating digital media assets including a navigation system configured to receive a search query in response to a user input and process the search query by applying the search query to a search index of digital media asset conventional and time-based metadata and determining search results of titles of and start points in time within digital media assets that satisfy the search query. The navigation system may then display the search results to the user through the user interface. The search results may be displayed in a hierarchical format, wherein the title of the digital media asset is displayed and upon selecting the title of the digital media asset, the start points in time within that digital media asset are displayed or played as a video to the user through the user interface.

20 Claims, 7 Drawing Sheets

(56) References Cited

U.S. PATENT DOCUMENTS

| | | | | |
|---|---|---|---|---|
| 2009/0164904 A1* | 6/2009 | Horowitz | .......... | G06F 17/30817 |
| | | | | 715/723 |
| 2010/0080534 A1* | 4/2010 | Kato et al. | ...................... | 386/95 |
| 2010/0169786 A1* | 7/2010 | O'Brien | ............... | G11B 27/034 |
| | | | | 715/738 |
| 2010/0329634 A1* | 12/2010 | Azulai | ................. | G11B 27/105 |
| | | | | 386/241 |

OTHER PUBLICATIONS

Sivic, J., and Zisserman, A. 2003. Video Google: A text retrieval approach to object matching in videos. In Proc. Int. Conf. on Computer Vision, 1470.1477.*

* cited by examiner

USER INTERFACE FOR VIEWING TARGETED SEGMENTS OF MULTIMEDIA CONTENT BASED ON TIME-BASED METADATA SEARCH CRITERIA

FIELD

The present systems and methods relate generally to the navigation or searching of metadata associated with digital media. More particularly, the present systems and methods provide a computer implemented system and user interface to enable a user quickly and easily to navigate or search for specific or discrete segments or portions of digital media by taking advantage of conventional metadata and time-based or time-correlated metadata associated with specific or discrete segments or portions of the digital media.

BACKGROUND

The Internet has made various forms of content available to users across the world. For example, Internet users access the Internet to view articles, research topics of interest, watch videos, etc. Online viewing of multimedia or digital media has become extremely popular in recent years. This has led to new applications emerging related to navigating, searching, and retrieving online multimedia or digital media, and in particular videos, such as movies, TV shows, and the like. However, users typically are not just looking for broad categories of videos in a search, but they are often searching for specific characters, scenes, quotations, objects, actions, or similar specific or discrete content that exists at one or more specific points in time inside the videos. Google Audio Indexing is among one of the newer technologies that allows users to perform better searches and pinpoint specific, but limited types of content within videos. Google Audio Indexing uses speech recognition technology to find words spoken inside videos and lets the user jump to the relevant scene of the video where those words are spoken. However, video content is intrinsically multimodal and merely being able to search for one element, such as a quote, is beneficial, but does not provide or allow for the capability to search for multiple elements of content that intersect within specific scenes or segments of a video and that may not include any specific spoken text. The multimodality of video content has been generally defined along three information channels or modalities: (a) a visual modality—that which can be visually seen in a video, (b) a auditory modality—speech or specific sounds or noises that can be heard in a video, and (c) a textual modality—descriptive elements that may be appended to or associated with an entire video (i.e., conventional metadata) or with specific scenes or points in time in a video (i.e., time-based or time-correlated metadata) that can be used to describe the video content in greater or finer or more nuanced detail than is typically available from just the visual or textual modalities. For each of these modalities, there is also a temporal aspect. While some content and information can be used generally to describe the entire video—there is a tremendous wealth of information that can be gleaned and used if the information is tied specifically to the point or points in time within the video in which specific events or elements or information occurs. Thus, indexing and very precise, targeted searching within videos is a complex issue and is only as good as the accuracy and sufficiency of the metadata associated with the video and, particularly, with the time-based aspects of the video.

The growing prominence and value of digital media, including the libraries of full-featured films, digital shorts, television series and programs, news programs, and similar professionally (and amateur) made multimedia (previously and hereinafter referred to generally as "videos" or "digital media" or "digital media assets or files"), requires an effective and convenient manner of navigating, searching, and retrieving such digital media as well as any related or underlying metadata for a wide variety of purposes and uses.

"Metadata," which is a term that has been used above and will be used herein, is information about other information—in this case, information about the digital media, as a whole, or associated with particular images, scenes, segments, or other subparts of the digital media. For example, metadata can identify the following types of information or characteristics regarding the digital media, including things such as actors appearing, themes present, or legal clearance to third party copyrighted material appearing in a respective digital media asset. Metadata may be related to the entire digital media (such as the title, date of creation, director, producer, production studio, etc.) or may only be relevant to particular segments, scenes, images, audio, or other portions of the digital media.

Preferably, when such metadata is only related to a sub portion of the digital media, it has a corresponding time-base (such as a discreet point in time or range of times associated with the underlying time-codes of the digital media). An effective and convenient manner of navigating, searching, and retrieving desired digital media through the effective use of metadata, and preferably several hierarchical levels or layers of metadata, associated with digital media, particularly when such metadata can be tied closely to specific and relevant points in time or ranges of time within the digital media asset, can provide significant value and is a much needed capability in the entertainment and advertising industries, to mention just a few.

SUMMARY

The systems and methods for navigating digital media disclosed herein provide a user interface to enable a user to navigate, search, or retrieve digital media, effectively, quickly, and selectively. More particularly, the systems and methods disclosed herein provide a computer implemented system and method to enable a user to navigate or search digital media assets using conventional or static metadata and time-based or time-correlated metadata associated with the digital media to retrieve a desired digital media asset or a specific start point in time or an end point in time within the digital media asset for desired search result or possible search results.

In an illustrative embodiment, the system and method for navigating digital media preferably includes at least one client device(s) and a navigation system. The navigation system preferably includes at least one computer server in communication with the client devices(s) and at least one database in communication with the computer server(s). The client devices(s) are preferably in communication with the navigation system via a user interface or via third party intermediary. The third party intermediary may be an Internet search engine, an Internet video provider, a video on demand provider, or other such parties of the type.

The computer server(s) typically include conventional processors, memory, I/O capabilities and components, and programming modules or computer readable media that enable performance of the functions and operation of the system as described herein. The database(s) typically include a search index, digital media (also referred to herein as "digital media assets" or just "assets"), and/or conventional metadata and time-based metadata associated with each of the digital media assets. In an illustrative embodiment, the database(s) include metadata that is arranged into categories and subcategories in accordance with the particular images, scenes, segments, or other subparts of each of the digital media assets.

The system and method preferably allow a user to navigate or search the database(s) using a search query to obtain, for example, a title, specific start point in time, end point in time, scene, segment, whole asset, etc. of one or more digital media assets that meet the user's search query. The categories and subcategories of metadata may be navigated or searched against using various navigation and search techniques. For example, a user may be interested in viewing all instance of the appearance of an actor/actress in a particular geographic location. By utilizing the systems and methods disclosed herein, the user can navigate or search multiple digital media assets for those segments or specific start points in time within the digital media assets that meet his/her requirements.

In an illustrative embodiment, the user preferably accesses a user interface or third party intermediary user interface (also referred to herein as "third party user interface") and enters a search query via the client device(s). The search query is preferably then transmitted to the navigation system. The computer server(s) preferably receive the search query and process the search query. The computer server(s) will typically search through the search index on the database(s) to obtain the specific metadata files within the database(s) that satisfy the search query. The computer server(s) then preferably transmit or stream the particular data associated with the digital media assets that satisfy the search query to a display on the client device(s) via the user interface or third party user interface. Thus, providing the user with the relevant data that meets the user's search query.

The computer server(s) preferably transmits the information associated with the segments of the digital media assets, for example, the title of the digital media asset and/or the start and/or end points in time within the digital media assets that satisfy the search query. The computer server(s) preferably then transmit or display thumbnail screen shots associated with the titles of, segments within, or points in time within the digital media assets that satisfy the search query. The computer server(s) preferably transmit for display the content of the digital media assets, for example, the entire digital media asset, the segments and/or the point sin time within the digital media asset, and/or clips of the actual content of the digital media assets that satisfy the search query. However, the information and/or data the computer server(s) transmits for display may be limited in content, time, or quality based on the rights of the owner (or the limited rights of the third party intermediary possessor) of the digital media assets that meet the search results. In one example, the digital media asset may be copyrighted and may only be distributed to authorized users who have authorization to obtain the digital media asset. Alternatively, when a digital media is available for public viewing, for example available to the public on the internet, the digital media asset, segments, start and end point in time, or clips of the digital media asset may be transmitted or streamed to the display on the client devices(s) via the user interface or third party user interface.

The systems and methods disclosed herein preferably enable the user to navigate, search, and retrieve desired segments or portions of a digital media asset using conventional and time-based or time-correlated metadata associated with the underlying digital media asset. The application and uses of such systems and methods disclosed herein are varied and numerous. For example, a user may navigate or search a number of categories and subcategories through which digital media may be filtered, applying multiple variables and obtaining reliable output of an appropriate digital media asset or portions thereof.

The above features as well as additional features and aspects of the systems and methods disclosed herein will become apparent from the following detailed description of illustrative embodiments of the systems and methods. In addition, other systems, methods, features and advantages will be or become apparent to one skilled in the art upon examination of the following drawings and detailed description. It is intended that all such additional systems, methods, features and advantages be included within this description and be within the scope of the present disclosure.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Detailed embodiments of the systems and methods for navigating digital media are disclosed herein, however, it is to be understood that the disclosed embodiments are merely exemplary of the systems and methods for navigating digital media, which may be embodied in various forms. Therefore, specific functional details disclosed herein should not be interpreted as limiting, but merely as a basis for the claims and as a representative basis for teaching one skilled in the art to employ various versions, implementations, and applications of the systems and methods disclosed herein.

Generally, the systems and methods described herein include and are implemented within a computer system having one or more databases and other storage apparatuses, servers, and additional components, such as processors, terminals and displays, computer-readable media, algorithms, modules, and other computer-related components. The computer systems are especially configured and adapted to perform the functions and processes of the systems as disclosed herein. Further, any results or outputs relating to the digital media files may be stored in a database, output as an electronic or printed report, displayed on a computer terminal or client device, or otherwise delivered to a system operator or user for analysis, review, or further processing.

As disclosed herein, the systems are shown in an exemplary environment in which the systems interact with one or more users directly, indirectly, or through a third party intermediary. A user includes, for example, an end user, an intermediary user, an Internet user, an authorized user, etc. An authorized user is typically associated with a corporate entity or company, such as a movie or television production studio, an advertising agency, an internet web service content provider, or other similar entity, that has permission to access specific digital media content and, in come cases, to create or edit metadata content associated with a respective digital media asset.

Figure 1:
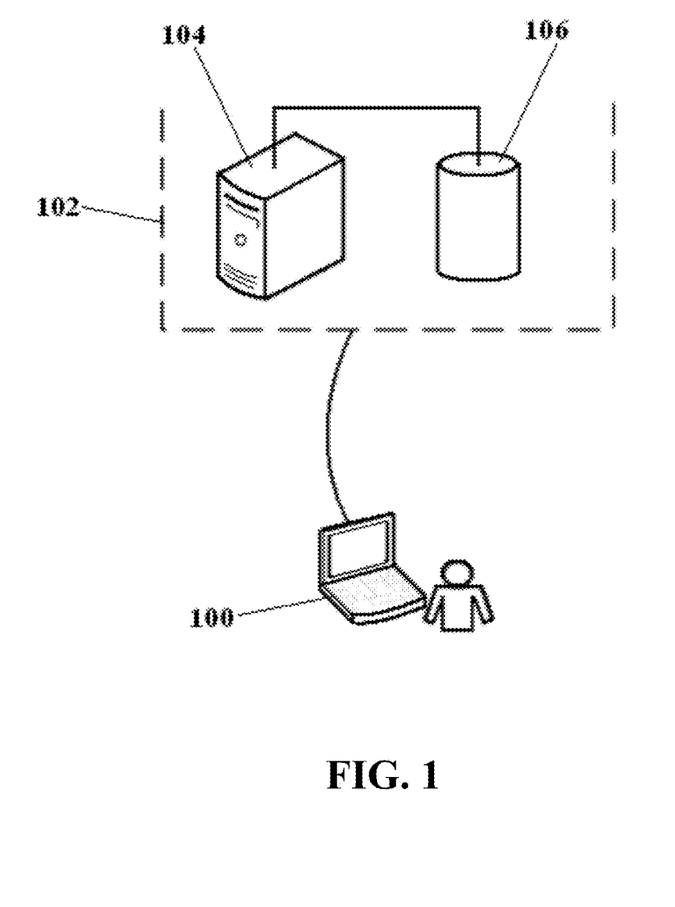
FIG. 1 illustrates an embodiment of a system architecture for implementing a system and method for navigating digital media.

Preferred system architecture for implementing the system and method for navigating digital media according to an illustrative embodiment is described with reference to FIG. 1. The system and method for navigating digital media preferably includes at least one client device(s) 100 in communication with a navigation system 102. The navigation system 102 includes, for example, at least one computer server 104 in communication with the client device(s) 100 and at least one database 106 in communication with and accessible by the computer server(s) 104.

The client device(s) 100 will typically be an electronic communication device, for example, computers; wireless computers; handheld/mobile computer devices; such as smart-phones, mobile phones, and/or PDAs, and set top boxes. The client device(s) 100 will typically be in electronic, bi-directional communication with the navigation system 102 via a wired or wireless network. For example, the client device(s) 100 may be networked directly, indirectly, through a third party intermediary, wirelessly, over the Internet, or otherwise with the navigation system 102 in a conventional manner.

The computer server(s) 104 preferably include conventional processors, memory, I/O capabilities and components, and programming modules and/or computer readable media that enable performance of the functions and operation of the system as described herein. The computer server(s) 104 may be in electronic, bi-directional communication with the client device(s) 100 via a wired or wireless network, for example, the computer server(s) 104 may be networked directly, indirectly, through a third party intermediary, wirelessly, over the Internet, or otherwise with the client device(s) 100 in a conventional manner.

Similarly, the database(s) 106 will typically be in electronic, bi-directional communication with the computer server(s) 104 via a wired or wireless network. For example, the database(s) 106 may be networked directly; indirectly, wirelessly, over the Internet, or otherwise with the computer server(s) 104. The database(s) 106 may be implemented in one or more hardware components and may be located locally or remotely from the computer server(s) 104—all in a conventional manner. The database(s) 106 preferably store, in electronic format, digital media assets or files that are accessed and used within the navigation system 102. The stored digital media assets may include, but are not limited to, movies, television programs, music videos, short clips, cartoons, commercials, internet-created videos, and other similar types of multimedia files, or data. Digital media assets may be associated with (or owned by) one or more particular customer(s) or user(s)—depending upon the copyright ownership rights and distribution or intersection of such rights relative to the entire asset or to portions or specific segments therein.

In addition, the database(s) 106 may include corresponding metadata files or data, such as conventional metadata and time-based metadata, associated with each of the respective digital media assets. Conventional metadata may include, for example, typical elements of content of the digital media assets, such as title, director, producer, year of creation, genre, actors or characters, basic plot synopsis or summary, audio, closed-caption text, and other similar media attributes commonly associated with conventional digital media assets. Time-based metadata is time-coded, such that each type of metadata is associated with a time-code or range of time-codes associated with the time codes of the respective digital media asset. Generally, the metadata includes identifiers or tags that provide descriptions and/or identification means for each item of metadata. For example, an identifier for metadata signifying a particular actor could be the actor's name. The identifiers or tags may describe a basic understanding or provide a detailed description of the associated digital media asset. The metadata identifiers preferably and ideally enable the metadata to be located easily and utilized within the navigation system 102.

The time-based metadata associated with each of the respective digital media assets are preferably organized using tracks and segments. A "track" is any attribute of a digital media asset that is definable along the timeline of the digital media asset. Such attributes may include, for example, an actor/actress, the appearance of an actor/actress, faces, emotions, objects, a location, an event occurring in the digital media asset, etc. A track may include a track name or a description that provides context to a user. A segment is the actual duration along the digital media asset's timeline that the track may be made accessible, for example visually or auditory, to the user. Any information that may be represented as a duration or point in time can be represented as a segment. Further, a segment may be extended to incorporate additional information, such as but not limited to detailed character information, extended rights management information, and advertising information. Generally, each digital media asset will include multiple tracks and each track will include one or more segments.

Each track and the underlying segment(s) may be populated within information derived by system enabling technologies, entered manually by a user through a user interface, or incorporated into the navigation system 102 and database(s) 106 from an external system via XML. In one illustrative embodiment, the systems and methods disclosed in U.S. patent application Ser. No. 12/905,080 are incorporated herein and may be used as one example for obtaining, creating, manipulating, and analyzing the metadata. The content of the U.S. patent application Ser. No. 12/905,080 is incorporated herein by reference in its entirety.

Further, the database(s) 106 may include a search index. The search index is preferably generated by the computer server(s) 104 of the navigation system 102. In one illustrative embodiment, the computer server(s) 104 parse the metadata associated with the various digital media assets, including the conventional metadata and time-based metadata associated with each digital media asset. The computer server(s) 104 then generate one or more indices of the metadata associated with the various digital media assets. For example, dual indices may be generated in which one corresponds to conventional metadata and the other corresponds to time-based metadata. The indices are preferably stored as a search index on the database(s) 106. The purpose of storing an index is to optimize the speed and performance of navigating or searching the data within the navigation system 102. Although, the search index is described as being on the database(s) 106, it should be appreciated that the search index may be stored on one or more separate linked or redundant databases that are in communication with the computer server(s) 104 and accessed in conventional manner.

To navigate or search the navigation system 102, the user of the client device(s) 100 may communicate with the navigation system 102 via the client device(s) 100 through a user interface. The user interface is preferably accessible to the user of the client device(s) 100 via the client device(s) 100 over a wired or wireless network. In an illustrative embodiment, the user interface is located on the computer server(s) 104 of the navigation system 102 and is remotely accessible to the user of the client device(s) 100 via the client device(s) 100 through the Internet. In another embodiment, the user interface may be a program module installed on the client device(s) 100 locally or computer readable media that enables the user of the client device(s) 100 to perform functions and operations via the client device(s) 100 on the navigation system 102, as described in greater detail herein.

Figure 2:
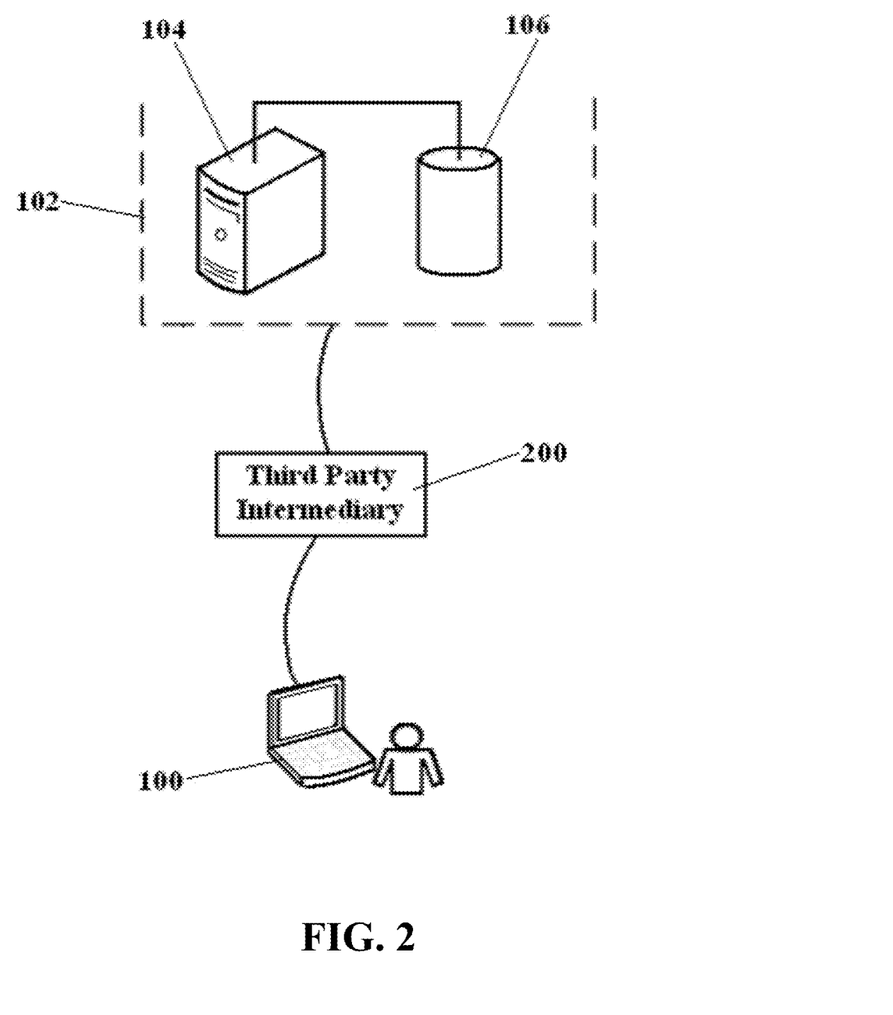
FIG. 2 illustrates an embodiment of a system architecture, including a third party intermediary, for implementing the system and method for navigating digital media.

Another system architecture, including a third party intermediary, for implementing the system and method for navigating digital media according to an illustrative embodiment is described with reference to FIG. 2. The system and method for navigating digital media may include at least one client device 100 in communication with a navigation system 102 through a third party intermediary 200. The navigation system 102 may include at least one computer server 104 in communication with the client device(s) 100 through the third party intermediary 200 and at least one database 106 in communication with the computer server(s) 104.

The third party intermediary 200 may be an Internet search engine, an Internet digital media provider, an Internet digital media search provider, a digital media on demand provider, a video on demand provider, an audio on demand provider, an audio/video on demand provider, or other such parties of a similar type that may benefit from being able to utilize the navigation system 100 described herein. The third party intermediary 200 may be provided with a suitable application program interface (API) or protocols may be established to enable the third party intermediary 200 and the navigation system 102 to communicate, transfer, and receive data from one another in compatible formats.

To navigate or search the navigation system 102, the user of the client device(s) 100 may communicate with the third party intermediary 200 via the client device(s) 100, for example through a third party user interface. The third party intermediary 200 may then communicate with the navigation system 102 through the API. The third party user interface may be accessible to the user of the client device(s) 100 via the client device(s) 100 over a wired or wireless network. The API may be accessible to the third party intermediary 200 via a wired or wireless network. In an illustrative embodiment, the API is located on the computer server(s) 104 of the navigation system 102 and is remotely accessible to the third party intermediary through the Internet. In another illustrative embodiment, the API is a program module installed on the third party intermediary 200 locally or computer readable media that enables the third party intermediary 200 to effectively communicate with the navigation system 102 as described herein.

Figure 3:
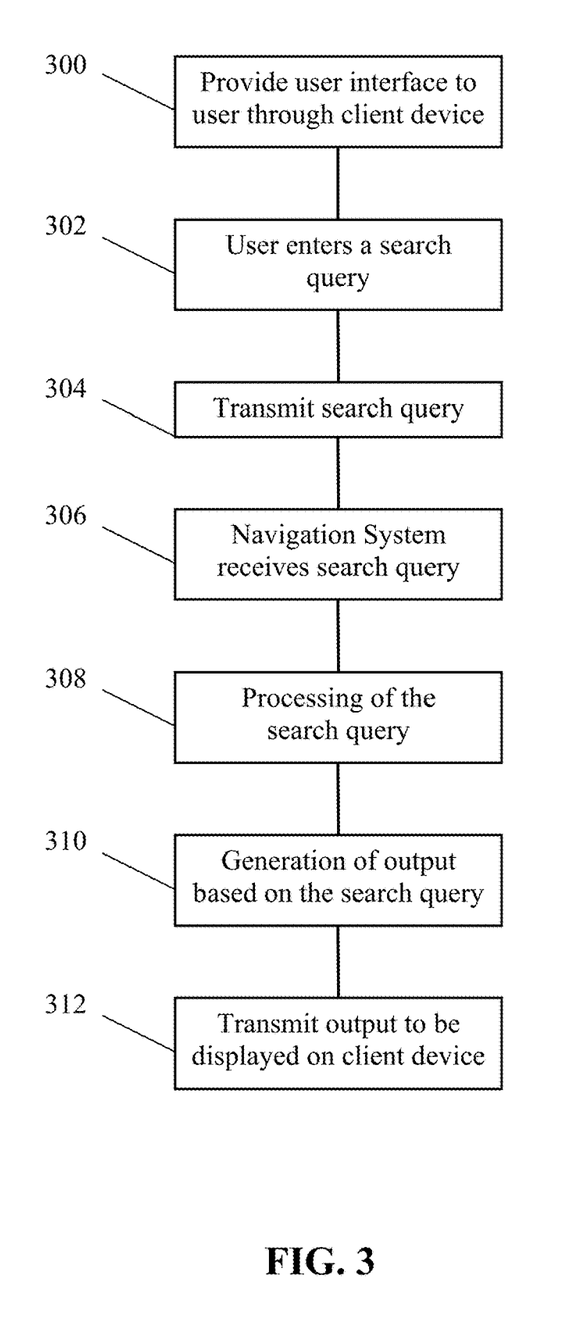
FIG. 3 illustrates an embodiment of a block diagram of a method for navigating digital media.

A method for navigating digital media according to an illustrative embodiment is described with reference to FIG. 3. A user interface is preferably provided 300 to the user through the client device(s) 100. The user interface may be a user interface provided 300 by the navigation system 102 or the computer server(s) 104 of the navigation system 102. Alternatively, the user interface may be a third party user interface provided 300 by the third party intermediary 200. Preferably, the user interface provided to the user through the client device(s) 100 is configured to receive a search input from the user via the client device(s) 100. The user interface may have a search input field (or fields) to receive a search query or a list of selections the user may select from (such as with a pull-down menu) to input one of a plurality of pre-defined search terms or queries.

The user may then enter a search query 302 into the search input field of the user interface through the client device(s) 100 and transmit 304 the search query. The search query may be transmitted to the navigation system 102 or the computer server(s) 104. Alternatively, the search query may be transmitted to the third party intermediary 200. When the search query is entered into the third party user interface and transmitted to the third party intermediary 200, the third party intermediary 200 may transmit the search query to the navigation system 102 or the computer server(s) 104. The third party intermediary 200 may transmit the search query to the navigation system 102 or the computer server(s) 104 through an API configured to communicate with the navigation system 102 or the computer server(s) 104.

The navigation system 102 or the computer server(s) 104 then receives the search query 306. The computer server(s) 104 of the navigation system 102 then process the search query 308. The search query may be processed 308 by applying the search query to the search index of the database(s) 106 or directly to the metadata, including the conventional metadata or the time-based metadata, stored on the database(s) 106 to determine the data that satisfies the search query. Preferably, the search query is parsed into the individual search terms and each search term is applied to the search index of the database(s) 106 to determine the intersections of the data that satisfies the search query. The computer server(s) 104 of the navigation system 102 is configured to process search queries containing common search operators, such as but not limited to, "AND," "NOT," "OR," "CONTAINING," proximity operators, for example "WITHIN . . . ," and other search operators of the type.

The computer server(s) 104 of the navigation system 102 preferably then generates 310 an output of the data within the database(s) 106 that satisfies the search query. The computer server(s) 104 of the navigation system 102 then transmits 312 the output to be displayed on the client device(s) 100. The output is preferably transmitted 312 by the computer server(s) 104 of the navigation system 102 to be displayed on the client device(s) 100 through the user interface. Alternatively, the output may be transmitted 312 by the computer server(s) 104 of the navigation system 102 to the third party intermediary 200 through the API. The output may then be displayed on the client device(s) 100 through the third party user interface. The method for navigating digital media may be repeated as desired in order to narrow, change, and/or enter a new search query to better suit the user's needs or desired results.

Preferably, the output that is generated by the computer server(s) 104 of the navigation system 102 in response to receiving a search query is displayed to the user on the client device(s) 100 through the user interface or the third party user interface. The output may include data that satisfies the search query such as, but not limited to, the title of digital media assets, start and/or end points in time within the digital media assets, thumbnail images of the digital media assets, thumbnail images of start and/or end points in time within the digital media assets; interactive links that allow the user to play the digital media asset and/or the start and/or end points in time within the digital media assets, summaries of the plot of the digital media assets, and/or other data of the type. However, the output the computer server(s) 104 transmits for display may be limited in content and/or in duration based no the rights of the owner or owners of the digital media assets, the possessor or provider of the assets in response to the search query, or by contract between the various parties involved. In one example, the digital media asset (or portions thereof) may be copyrighted by multiple parties and may only be distributed to authorized users who have authorization to obtain the digital media asset, may not be distributable at all, or may have strict limits or controls on such distribution. Alternatively, when a digital media (in its entirety or for discrete portions that satisfy any search query) is available for public viewing, for example available to the public on the Internet, the digital media asset, segments, start and/or end point in time, or clips/scenes of the digital media asset may be transmitted or streamed to the display on the client device(s) 100 via the user interface or third party user interface.

In an illustrative embodiment, the output generated is in a traditional folder➔ File➔ subfile hierarchical format. The hierarchical format may be, for example, in the case of a movie, title of the movie➔ specific start and/or end points in time within the movie that satisfies the search query. In another example, in the case of a TV Series, the hierarchical format may be the title of the TV Series ➔ season of the TV Series➔ episodes of the season of the TV Series➔ specific start and/or end points in time within an episode of the season of the TV Series that satisfies the search query.

Figure 4:
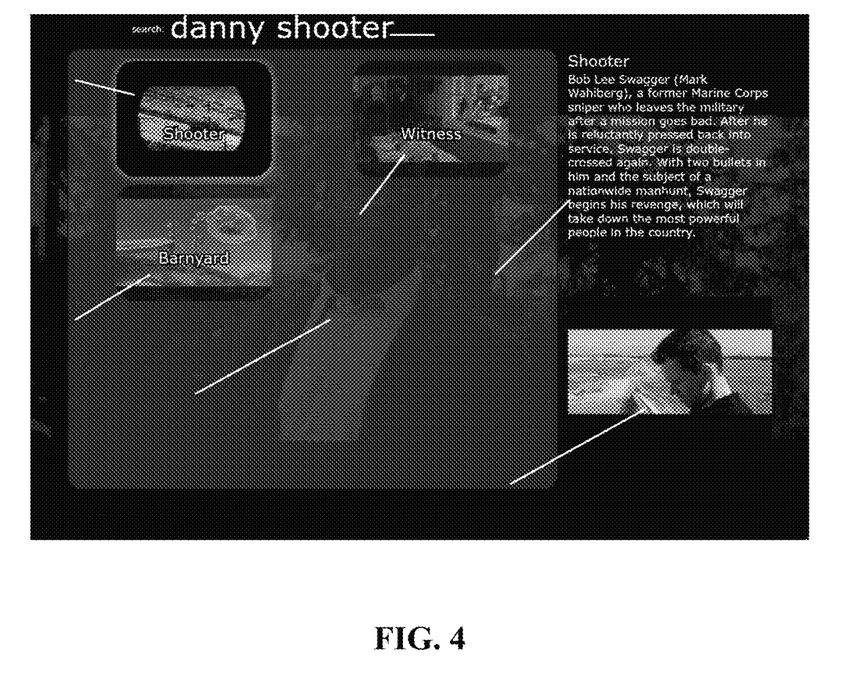
FIG. 4 illustrates an embodiment of a screen display of a user interface displaying an output generated by the navigation system in response to a search query.

Screen displays of a user interface displaying the output generated by the navigation system 102 in response to a search query according to an illustrative embodiment are described with reference to FIGS. 4-6. FIG. 4 illustrates one preferred or exemplary user interface 400 displaying the output generated by the navigation system in response to a search query, "danny shooter," wherein the terms "danny" and "shooter" are interpreted to have an "AND" operator between them. The user interface 400 includes a search input field 402, a results panel 404, a summary display panel 406, and a thumbnail display panel 408. The search query "danny shooter" is entered into the search input field 402 of the user interface 400. The search query "danny shooter" is processed and results are generated and displayed in the results panel 404. The results generated, as illustrated in FIG. 4, are thumbnails of the title of the digital media assets, in order of highest to lowest relevance, that satisfy the search query, "danny shooter." In this example, there are three digital media assets, movies or videos in the relevant database(s) 106, in which the search query "danny shooter" is satisfied. The search query "danny shooter" is satisfied in the movies "Shooter," "Witness," and "Barnyard" and standard sized thumbnails 410, 412, and 414 are displayed in the interface, one corresponding to each movie.

The summary display panel 406 preferably displays a summary of the plot of the highest ranked movie or one of the lower "ranked" movies if selected (e.g., by rolling over the scene with the mouse or by single or double clicking on such thumbnail). As illustrated in FIG. 4, the thumbnail 410 of the movie "Shooter" is highlighted. When the thumbnail 410 of the movie "Shooter" is highlighted, the summary display panel 406 displays the summary of the movie "Shooter" that was provided from the database 106. While the summary display panel 406 is described as displaying a summary of the highlighted movie, it should be appreciated that any other information may be displayed in the summary display panel 406, selected by the user, by the third party intermediary, by the operator of the computer server 104, or by the owner of the movie, and can include any information related to the selected movie that is available from the database(s) 106 or from another database, such as an advertisement server database that displays an ad or link that may be relevant to the search results. Additionally, the thumbnail display panel 408 preferably displays a thumbnail picture of a point within the movie that is the first frame of the start time of the segment for the relevant search query or it may represent the best or pre-selected best image from within the relevant segment that matches the search query. The thumbnail display panel 408 may also cycle through a number of thumbnail pictures of points in time or "key" points in time from within the segment associated with the search results and for the movie that has been selected or highlighted by the user. In one embodiment, the thumbnail display panel 408 cycles through images form the start points in time within the movie (or movies), wherein each image is associated with the start points in time correspond to start points in time within the movie where the search query is satisfied or true or displays the key or main image generally associated with the segments(s) that match the search query, if such key images have previously been identified for a relevant segment of the movie or if the highest ranking frame from within the segment that matches the search query can be determined.

The thumbnails 410, 412, and 414 are preferably interactive to allow a user to select one of the thumbnails 410, 412, and 414 and the movie corresponding to that thumbnail. In an illustrative example, the user may select, for example by clicking on, the thumbnail 412 corresponding to the movie, "Witness." When the thumbnail 412 corresponding to the movie, "Witness," is selected or chosen by the user within the user interface, in conventional manner, such as by single or double clicking the thumbnail, the user interface preferably displays the selected digital media asset, "Witness," visually to the user—within the thumbnail image location, within a separate window display panel, or in full screen mode.

Figure 5:
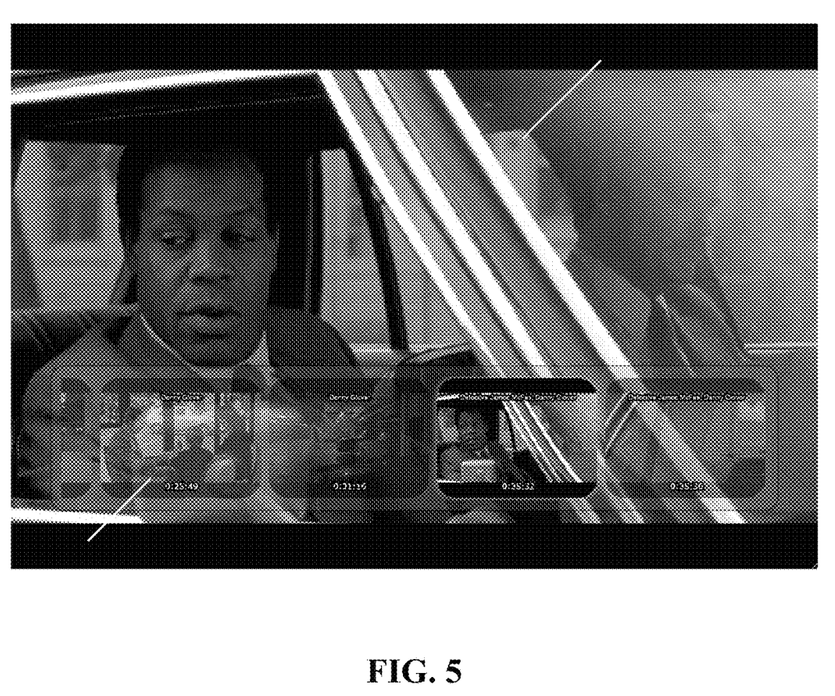
FIG. 5 illustrates an embodiment of a screen display of a user interface displaying a video player panel in response to a user selecting a digital media asset result.
Figure 6:
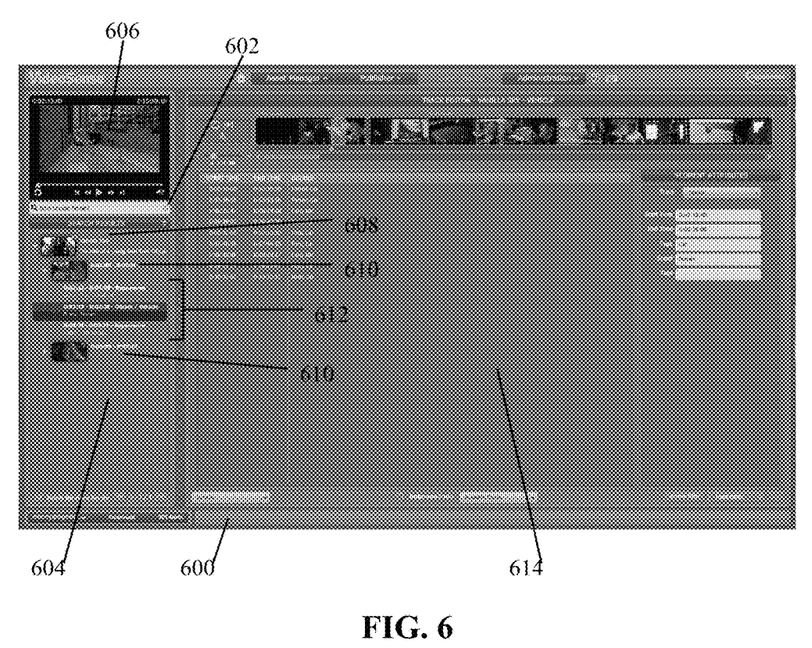
FIG. 6 illustrates an embodiment of a screen display of a user interface displaying an output generated by the navigation system in a hierarchical format.

As illustrated in FIG. 5, when the thumbnail 412 corresponding to the movie, "Witness," is selected, the user interface 500 is displayed to the user on the client device(s) 100. The user interface 500 preferably includes a video player panel 502 and, if there are more than one segment from within the relevant movie that meet the search criteria, a filmstrip panel 504. In such a case, the video player panel 502 displays the first or most highly relevant segment of the digital media asset, "Witness," visually to the user in response to the user selecting the movie, "Witness." In some embodiments, the start and end times associated with the segment may also be displayed or shown within the video display panel 502 or at another location of the user interface 500. In an illustrative embodiment, the video player panel 502 displays to the user the start and/or end points in time within the selected digital media asset, "Witness," where the search query is satisfied. In this example, the start or end points in time within the digital media asset, "Witness," where the search terms "danny" and "shooter" are both present. The video player panel 502 preferably further includes traditional video or movie player functionality (e.g., play, pause, stop, fast forward, reverse, advance to next scene, reverse to previous scene, volume control, and optionally a timeline slider, a current time start and stop time code location of the current segment, and possibly the start and end times for the entire media asset).

The filmstrip panel 504, which preferably include semi-transparent thumbnail images that overlay the main video display panel, illustrate other segments of the same video media asset that satisfy the search criteria. Such thumbnails may be arranged in time sequence order or they may be arranged in order of likely importance or relevance based on past user experience or other ranking criteria. Whether they are shown in sequential order or in order of likely relevance is a matter of selection by the operator of the interface and, if desired, may be configurable by the end user in a preference setting. The filmstrip panel 504 includes a series of thumbnails associated with the digital media asset, "Witness," and are representative of one or more segments that fall between the start and stop time points of the digital media asset that satisfy the search criteria. The user may then select, cycle, or jump back and forth through the various segments for display within the larger display panel 502 to quickly and easily find the one or more segments that the user was targeting with the particular search query. When the user selects a new segment, the segment that was previously displayed in the larger view panel 502 reverts down to a thumbnail in the filmstrip section 504 of the screen. If the user does not stop the viewing of a particular segment, the segment being displayed in the main video panel will preferably play from its relevant start point to its relevant end point (or, for a set duration that may or may not expire before the segment actually reaches its set end point). Alternatively, in some embodiments, the system can be configured to play the entire media asset from the segment start point to its end unless and until interrupted by the user through the use of the stop or pause functionality, through selection of a different segment, or by navigating the user interface to a different media asset or out of the program or application altogether, in conventional manner.

In an illustrative embodiment, as shown in FIG. 4, the thumbnails 410, 412, and 414 are preferably interactive to allow the user to select one of the thumbnails 410, 412, and 414 and the movie corresponding to that thumbnail. When the user selects, for example by clicking on, a thumbnail, the user is preferably presented with the interface shown in FIG. 5.

In an alternative embodiment, the user may be presented with an interface having much greater functionality, but one that is less user friendly or intuitive, which displays the relevant assets and their respective segments that satisfy the search query in a tree or file hierarchical format. Such an interface 600 is shown in FIG. 6. As illustrated in FIG. 6, the user interface 600 may be displayed to a user on the client device(s) in response to a search query, in this example, of "tom cruise Ferrari," wherein the search terms are interpreted by the computer server(s) 104 of the navigation system 102 to have an "AND" operator between them. The user interface 600 may include a search input field 602, a search results panel 604, and a video player panel 606.

The search results panel 604 preferably displays the search results in a hierarchical format. As illustrated, the search results panel 604 displays the title of the digital media asset 608, "Vanilla Sky," which was the only asset that was found in the database in response to the search query "tom cruise Ferrari." The title 608 may then be expanded in conventional format (with right/down arrows or with plus/minus boxes) to display the relevant segments that satisfy the search query and their corresponding start and end points in time 610, in time (or relevance) order, within the digital media asset, "Vanilla Sky." Further, the relevant segment that matches the search criteria may be expanded to display the specific track(s), along with their relevant start and end points in time 610 that make up resulting segment 610 that satisfy the search query.

In an illustrative embodiment, the video player panel 606 displays to the user the currently chosen or highlighted segment from within the selected digital media asset, "Vanilla Sky," that satisfies the search query. The video player panel 606 preferably includes traditional video or movie player functionality (play, pause, stop, fast forward, reverse, advance to next scene, reverse to previous scene buttons), volume control, timeline slider, plus a current time code location of the current scene and the ending time code, which represents the total hours, minutes, and seconds of the selected asset. The video player panel 606 may be configured to be moved from the upper left corner of the user interface 600 and placed anywhere on the user interface 600. Additionally, the video player panel 606 may be configured to be enlarged to fill the screen on which the video player panel 606 is being viewed or to be opened within its own, separate window (not shown) from the user interface 600.

The user may select or cycle through the various segments 610 within the digital media asset, "Vanilla Sky," that satisfy the search query to view in the video player panel 606. When a particular segment 610 within the digital media asset, "Vanilla Sky," is selected, the video player panel 606 may play or begin the digital media asset, "Vanilla Sky," starting at the start point in time for that segment and ending at the end point of the segment, at the end point of the media asset, or after a predetermined period of time that may or may not exceed the end point of the segment.

Additionally, the user interface 600 may include a track editor 614, which may only be available or accessible by authorized users. The track editor 614 is described in greater detail in U.S. patent application Ser. No. 12/905,080, which is incorporated herein by reference in its entirety.

In another illustrative embodiment, the user interface displayed to the user through the client device(s) 100 may be a third party user interface. The output generated by the computer server(s) 104 of the navigation system 102 in response to receiving a search query may be transmitted to a third party intermediary through an API. The third party intermediary may then display the output generated by the computer server(s) 104 of the navigation system 102 on the client device(s) 100 through the third party user interface. The third party user interface may display the output generated by the computer server(s) 104 of the navigation system 102 as described with reference to FIGS. 4-6. Additionally, it should be appreciated that the third party user interface may display the output in other conventional forms or formats that the third party intermediary desires. In one example, the third party intermediary may display the output generated by the computer server(s) 104 of the navigation system 102, as described with reference to FIGS. 4-6, as a panel within the third party user interface.

In other illustrative embodiments, in addition to the above described forms or formats, the output generated by the computer server(s) 104 of the navigation system 102 in response to receiving a search query may be displayed on the client device(s) 100 through the user interface or third party user interface in any form or format. The output generated by the computer server(s) 104 of the navigation system 102 may be displayed as text, for example a title of a movie and start or end points in time within the movie that satisfy the search query. The output generated by the computer server(s) 104 of the navigation system 102 may be displayed as hyperlinks, that when selected directs the user to another location where the user may find additional information or view a particular digital media asset. The output generated by the computer server(s) 104 of the navigation system 102 may be displayed as text, thumbnails, hyperlinks, digital media audio or video streams, pictures, icons, or other such forms or formats of the type.

In other illustrative embodiments, the output generated by the computer server(s) 104 of the navigation system 102 in response to receiving a search query may include additional viewing information or data or hyperlinks to be displayed on the client device(s) through the user interface or third party user interface. The output generated by the computer server(s) 104 of the navigation system 102 may include information or hyperlinks relating to scheduling data, which may inform the user when where, or how a particular digital media asset may be viewed. The output generated by the computer server(s) 104 of the navigation system 102 may include information or hyperlinks relating to places where the user may purchase or download to own a particular digital media asset. The output generated by the computer server(s) 104 of the navigation system 102 may include information related to subscription based services or video on demand services where the user may view or obtain the digital media asset. In one exemplary embodiment, the above-described viewing information or data may be made available to the user upon selecting a particular search result, for example a movie, video TV series, TV series season, TV series episode, or other digital media asset of the type.

The output generated by the computer server(s) 104 of the navigation system 102 in response to receiving a search query may be generated by searching the conventional or time-based metadata stored on the database(s) 106. In an illustrative embodiment, the conventional and time-based metadata is structured, indexed, and searched by the computer server(s) 104 of the navigation system 102.

In an illustrative embodiment, the conventional metadata is structured and indexed using conventional methods, while the time-based metadata is organized or structured using tracks and segments. As described above, a track is any attribute of a digital media asset that is definable along the timeline of the digital media asset, and a segment is the actual duration along the digital media asset's timeline that the track is accessible or occurs within the asset. The tracks may be associated with different attributes, for example a track may be associated with a track type and a track name. The track type may be an attribute classification scheme, for example track types may include, but are not limited to, actor, actress, event, object, key word, location, closed caption, etc. The track name may be used to attach a description that provides context to a user, for example a track name associated with the track type "actor" may be the name of an actor, for example "John Smith." In another example, a track name associated with the track type "location" may be the name of restaurant, building, street, etc.

In an illustrative embodiment, the conventional and time-based metadata may be indexed to form one or more indices, for example a search index. The conventional metadata may be indexed using conventional indexing methods. To index the time-based metadata, the time-based metadata of the digital media asset is preferably organized into clips. More particularly, the visual or audio timeline of a digital media asset may be broken into subsequent clips of a small duration, for example 1 second, 2 second, . . . 30 seconds, . . . n seconds in duration. The subsequent clips may be associated with a numeric value such as 1, 2, 3, . . . n. The clip identifiers may be sequentially associated with the timeline of the digital media asset, for example a clip having a clip identifier of 1 should be located along the timeline of the digital media asset prior to a clip having a slip identifier of 2, etc. A clip may include two portions, a data portion and a semantic portion. The data portion may reflect the subset of identifiable attributes of a clip, for example the track names, duration of the clip, etc. The semantic portion may include ontology driven semantic data for the information in the data portion, for example the track types. Generally, clips of a short duration should have smaller sets of attributes associated with them and should create larger sets of clips to be indexed. On the other hand, clips of a longer duration should have larger sets of attributes associated with them and should create smaller sets of clips to be indexed. However, short clips provide better context for attributes with respect to the timeline, which should allow searching at finer granularity with respect to time. Further, the clips can be overlapped to create contextual relations among the clips. Overlapping slips may lead to a larger number of clips that need to be indexed.

Figure 7:
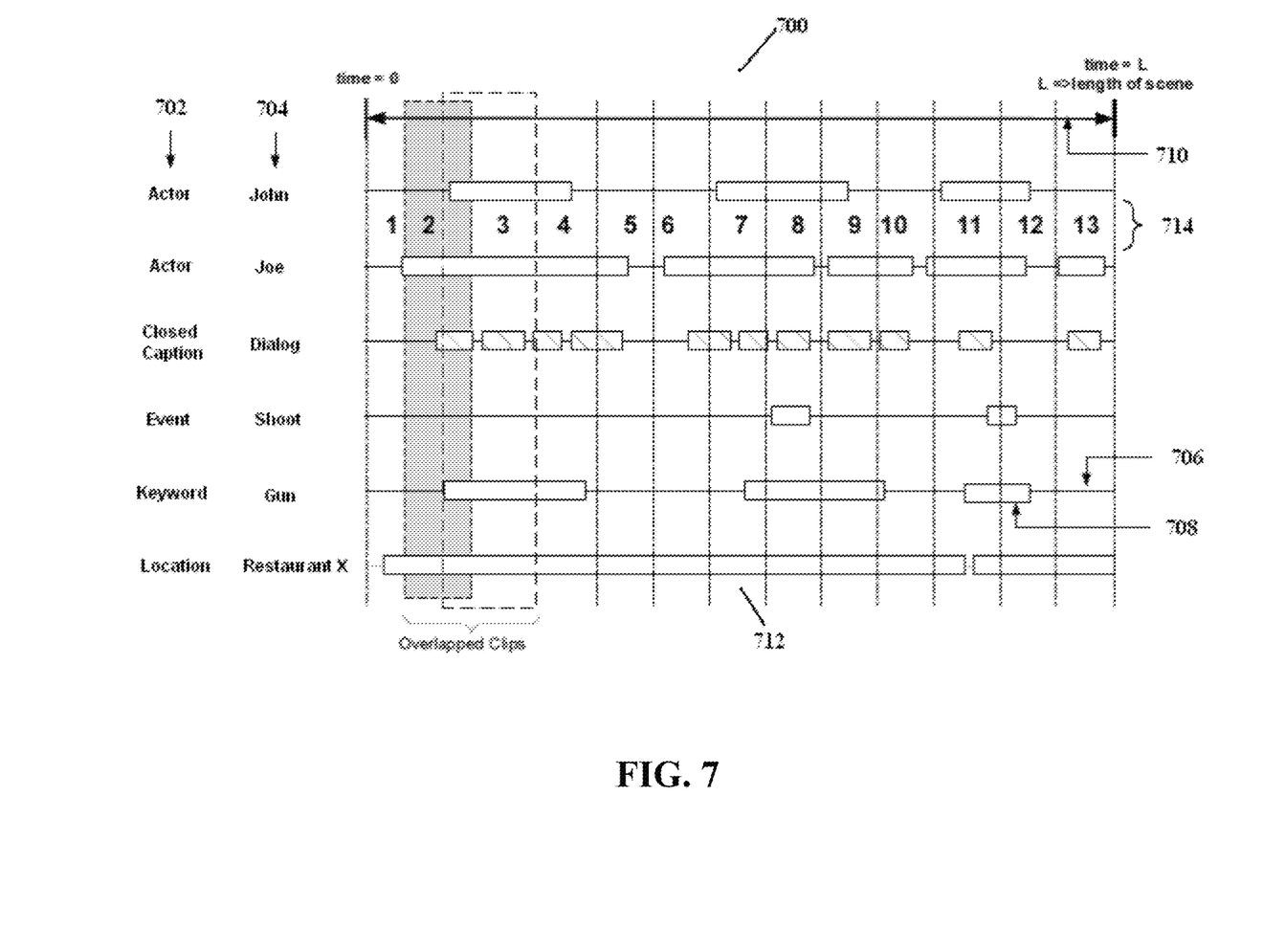
FIG. 7 illustrates an embodiment of a scene of a digital media asset's time-based metadata organized by the navigation system.

A scene of a digital media asset's time-based metadata organized by the navigation system according to an illustrative embodiment is described with reference to FIG. 7. As illustrated in FIG. 7, the scene 700 of length L of a digital media asset has track types 702 and track names 704 associated with each track 706. Segments 708 identify the start and end points in time along a track timeline 710 for each track 706 where the track name 704 is present within the scene 700, for example the track name 704 "Restaurant X" associated with the track type 702 "Location" is present within the scene 700 almost for the entire duration of the scene 700. The scene 700 is broken into thirteen clips 712 of short duration, wherein each clip has a start and end point in time within the scene 700. Each clip 712 may also be associated with a numeric clip identifier 714.

The track information allows for the characterization of each clip 712 with different attributes, such as the track types 702 or the track names 704. The segment information provides time-based context to allow for clips 712 to be used for reconstructing scenes or shots. The reconstruction may be done by merging or splitting clips 712 along the timeline of the digital media asset.

Utilizing the clips 712 and the data associated with the clips 712, a search index may be generated by the computer server(s) 104 of the navigation system 102 and stored on the database(s) 106. In an illustrative example, an inverted index may be generated based on a clip's characteristics, for example the track names 704, and the clip identifiers 714. In one example, the track name 704 "Shoot" associated with the track type 702 "Event" may be indexed with the clips 712 or clip identifiers 714 in which the track name 704 "Shoot" occurs within the scene 700. Thus, for example, the track name 704 "Shoot" may have a clip set containing the clip identifiers 714: 8, 11, 12.

When the computer server(s) 104 of the navigation system 102 receives a search query, the computer server(s) 104 may search the search index, containing the conventional and time-based metadata, on the database(s) 106 to obtain an intersection of the clip sets for the attributes being searched. As an illustrative example, referencing FIG. 7, when the computer server(s) 104 receives a search query of "joe shoot gun," the computer server(s) 104 generates a results set of the clip identifiers 8, 11, 12. The computer server(s) 104 may then reconstruct the scenes to yield a final result of two scenes reconstructed as Scene One, which consists of clip 8, and Scene Two, which consists of clips 11 and 12. Since clips 11 and 12 are consecutive to each other the clips 11 and 12 may be merged together to form a single scene. It should be appreciated that during reconstruction any number and any combination of clips may be merged together to form a single scene. The Scene(s) generated by the computer server(s) 104 may then be presented as the output or search results to the user via the user interface. The time-based metadata may be associated with the conventional metadata, thus Scene(s) may be a sub-result located under the title of the digital media asset, which the Scene(s) are a part of, in a hierarchical format.

It should be appreciated that the data on the database(s) 106 may be edited, updated, or new data may be added. For example new digital media assets and metadata corresponding to the new digital media assets may be added to the database(s) 106 as the new digital media assets are released. Thus, the search index may be updated or synced with the database(s) 106 to ensure the search index accurately corresponds to the digital media assets and their corresponding metadata. The computer server(s) 104 may sync the search index with the database(s) continuously or periodically, for example every 10 seconds, every minute, every 10 minutes, or at any other desirable time increment. Further, it should be appreciated that the search index described above has the flexibility to incorporate attributes or constraints at a very granular level. An example of the constraints may include, for example, restricting blocks of scenes from being viewed by users. This may be used to prevent users from viewing inappropriate scenes, for example, adult content and/or violent content. By dividing up the entire video into smaller clips, it is possible to assign constraints at a very fine granularity.

In an illustrative embodiment, the computer server(s) 104 may utilize a ranking scheme to rate the search results, for example, the video segments and/or scenes, best matching a search query. The ranking scheme may enable the computer server(s) 104 to display the search results in a ranked order, wherein the highest ranked or most relevant search result of a search query is displayed to the user at the top of the list of search results. The ranking scheme may involve assigning a numeric weight to each search result based on the relevance of each search result. Relevance may be measured using semantic and knowledge based techniques. The semantic approach may perform a contextual search for semantic ontological data. For example, an actor named "John Smith" should be ranked differently than a movie character named "John Smith" which in turn should be ranked differently from all dialogues containing the name "John Smith." The knowledge-based technique is useful in finding matches against definitional and attribute-based metadata. For example, searching for the term "John Smith" should pinpoint to segments within the digital media assets that show scenes with "John Smith" in them.

To rank the search results, numerical scores may be assigned to each track type or other attribute. The score of a search result may be the summation of the scores of each track type or other attribute within that search result. The score values may be predetermined or the computer server(s) 104 may include a feedback or learning component that adjusts the scores based on user activity or behavior. As an illustrative example, if results are displayed in response to a search query and the majority of users are selecting a result ranked second or third in the list, the computer server(s) 104 may interpret such behavior as indicating that the second or third result is more relevant than the top ranked result and adjust the ranking scores to rank the result the users are selecting as the top ranked or most relevant result.

While the systems and methods for navigating digital media have been described and illustrated in connection with preferred embodiments, many variations and modifications will be evident to those skilled in the art and may be made without departing from the spirit and scope of the systems and methods disclosed herein. The systems and methods are thus not to be limited to the precise details of methodology or construction set forth above as such variations and modification are intended to be included within the scope of the present disclosure.

The invention claimed is:

1. A method for navigating digital media comprising:
receiving, by a computer server, a search query comprising one or more search terms;
searching at least one database based on the one or more search terms, the database comprising attributes of at least a plurality of digital videos, each video in the plurality of digital videos comprising two or more time-based segments, each of the time-based segments associated with a different time span within the video, the database associating particular attributes of particular digital videos with particular time-based segments within those particular digital videos;
responsive to the search query, based on the searching, causing display of a summary search result interface comprising information about at least two or more digital videos, each selected for inclusion in the summary search result interface for having at least one time-based segment associated with attributes that match the one or more search terms;
receiving, by the computer server, a selection of a first digital video of the two or more digital videos; and
in response to receiving the selection of the first digital video:
identifying a plurality of the two or more time based segments of the first digital video as having attributes that match the one or more search terms; and
causing display of a video player interface for playing the plurality of the two or more time-based segments of the first digital video consecutively in order from greatest match of the attributes to the one or more search terms to least match of the attributes to the one or more search terms, within the first digital video, along with selectable thumbnail screen shots representing other time-based segments of the plurality of the two or more time-based segments.

2. The method of claim 1, wherein the selectable thumbnail screenshots, when selected, cause the video player interface to play corresponding time-based segments within the first digital video in place of the first time-based segment.

3. The method of claim 1, wherein the summary search result a given digital video of the two of more digital videos is displayed with a given thumbnail screenshot selected from a highest ranked time-based segment within the given digital video, relative to the one or more search terms.

4. The method of claim 1, wherein the other time-based segments are displayed in a search relevance order, other than the order in which the other time-based segments occur chronological within the first digital video.

5. The method of claim 1, wherein the particular attributes include ratings of the particular time-based segments within the particular digital videos, a given digital video having at least two content segments with different ratings, wherein searching the database comprises filtering the time-based segments based on the ratings.

6. The method of claim 1, wherein the attributes are of various attribute types, the attribute types including at least titles, actors, characters, and descriptions, wherein the searching comprises ranking video segments differently depending on the attribute types of the attributes of the video segments that match the search query one or more search terms.

7. The method of claim 1, wherein the searching comprises:
identifying multiple clips, within the first digital video, whose attributes match the one or more search terms;
identifying the first time-based segment by merging a group of consecutive clips whose attribute match the one or more search terms.

8. A system for navigating digital media comprising:
a computer server comprising one or more computer processors;
the computer server configured to receive a search query comprising one or more search terms;
the computer server further configured to search at least one database based on the one or more search terms, the database comprising attributes of at least a plurality of digital videos, each video in the plurality of digital videos comprising two or more time-based segments, each of the time-based segments associated with a different time span within the video, the database associating particular attributes of particular videos with particular time-based segments within those particular videos;
the computer server further configured to, responsive to the search query, based on the searching, cause display of a summary search result interface comprising information about at least two or more digital videos, each selected for inclusion in the summary search result interface for having at least one time-based segment associated with attributes that match the one or more search terms;
the computer server further configured to receive a selection of a first digital video of the two or more digital videos; and
the computer server further configured to, in response to receiving the selection of the first digital video:
identify a plurality of the two or more time based segments of the first digital video as having attributes that match the one or more search terms; and
cause display of a video player interface for playing the plurality of the two or more time-based segments of the first digital video consecutively in order from greatest match of the attributes to the one or more search terms to least match of the attributes to the one or more search terms, within the first digital video, along with selectable thumbnail screen shots representing other time-based segments of the plurality of the two or more time-based segments.

9. The system of claim 8, wherein the selectable thumbnail screenshots, when selected, cause the video player interface to play corresponding time-based segments within the first digital video in place of the first time-based segment.

10. The system of claim 8, wherein the summary search result interface comprises selectable thumbnail screen shots for the two or more digital videos, wherein a given digital video of the two of more digital videos is displayed with a given thumbnail screenshot selected from a highest ranked time-based segment within the given digital video, relative to the one or more search terms.

11. The system of claim 8, wherein the other time-based segments are displayed in a search relevance order, other than the order in which the other time-based segments occur chronological within the first digital video.

12. The system of claim 8, wherein the particular attributes include ratings of the particular time-based segments within the particular digital videos, a given digital video having at least two content segments with different ratings, wherein searching the database comprises filtering the time-based segments based on the ratings.

13. The system of claim 8, wherein the attributes are of various attribute types, the attribute types including at least titles, actors, characters, and descriptions, wherein the searching comprises ranking video segments differently depending on the attribute types of the attributes of the video segments that match the search query one or more search terms.

14. A non-transitory computer readable medium storing instructions, which when executed by one or more processors cause performance of:
receiving, by a computer server, a search query comprising one or more search terms;
searching at least one database based on the one or more search terms, the database comprising attributes of at least a plurality of digital videos, each video in the plurality of digital videos comprising two or more time-based segments, each of the time-based segments associated with a different time span within the video, the database associating particular attributes of particular videos with particular time-based segments within those particular videos;
responsive to the search query, based on the searching, causing display of a summary search result interface comprising information about at least two or more digital videos, each selected for inclusion in the summary search result interface for having at least one time-based segment associated with attributes that match the one or more search terms;
receiving, by the computer server, a selection of a first digital video of the two or more digital videos; and
in response to receiving the selection of the first digital video:
identifying a plurality of the two or more time based segments of the first digital video as having attributes that match the one or more search terms, and
causing display of a video player interface for playing the plurality of the two or more time-based segments of the first digital video consecutively in order from greatest match of the attributes to the one or more search terms to least match of the attributes to the one or more search terms, within the first digital video, along with selectable thumbnail screen shots representing other time-based segments of the plurality of the two or more time-based segments.

15. The non-transitory computer readable medium of claim 14, wherein the selectable thumbnail screenshots, when selected, cause the video player interface to play corresponding time-based segments within the first digital video in place of the first time-based segment.

16. The non-transitory computer readable medium of claim 14, wherein the summary search result interface comprises selectable thumbnail screen shots for the two or more digital videos, wherein a given digital video of the two of more digital videos is displayed with a given thumbnail screenshot selected from a highest ranked time-based segment within the given digital video, relative to the one or more search terms.

17. The non-transitory computer readable medium of claim 14, wherein the other time-based segments are displayed in a search relevance order, other than the order in which the other time-based segments occur chronological within the first digital video.

18. The non-transitory computer readable medium of claim 14, wherein the particular attributes include ratings of the particular time-based segments within the particular digital videos, a given digital video having at least two content segments with different ratings, wherein searching the database comprises filtering the time-based segments based on the ratings.

19. The non-transitory computer readable medium of claim 14, wherein the attributes are of various attribute types, the attribute types including at least titles, actors, characters, and descriptions, wherein the searching comprises ranking video segments differently depending on the attribute types of the attributes of the video segments that match the one or more search terms.

20. The non-transitory computer readable medium of claim 14, wherein the searching comprises:
   identifying multiple clips, within the first digital video, whose attributes match the one or more search terms;
   identifying the first time-based segment by merging a group of consecutive clips whose attribute match the one or more search terms.

* * * * *

UNITED STATES PATENT AND TRADEMARK OFFICE
CERTIFICATE OF CORRECTION

| | | |
|---|---|---|
| PATENT NO. | : 10,372,758 B2 | Page 1 of 1 |
| APPLICATION NO. | : 13/334285 | |
| DATED | : August 6, 2019 | |
| INVENTOR(S) | : Matthew Berry | |

It is certified that error appears in the above-identified patent and that said Letters Patent is hereby corrected as shown below:

In the Claims

At Column 18, Claim 13, Line 16, delete "search query".

Signed and Sealed this
Tenth Day of September, 2019

Andrei Iancu
*Director of the United States Patent and Trademark Office*